(12) United States Patent
Mullins et al.

(10) Patent No.: US 10,245,455 B2
(45) Date of Patent: Apr. 2, 2019

(54) FIREFIGHTER TRAINING UNIT

(71) Applicant: Deakin University, Geelong (AU)

(72) Inventors: James Mullins, Grovedale (AU);
Matthew Watson, Highton (AU);
Michael Fielding, Highton (AU); Saeid Nahavandi, Highton (AU)

(73) Assignee: Deakin University, Geelong (AU)

( * ) Notice: Subject to any disclaimer, the term of this patent is extended or adjusted under 35 U.S.C. 154(b) by 0 days.

(21) Appl. No.: 15/552,153

(22) PCT Filed: Feb. 19, 2016

(86) PCT No.: PCT/AU2016/050115
§ 371 (c)(1),
(2) Date: Aug. 18, 2017

(87) PCT Pub. No.: WO2016/131110
PCT Pub. Date: Aug. 25, 2016

(65) Prior Publication Data
US 2018/0028851 A1    Feb. 1, 2018

(30) Foreign Application Priority Data

Feb. 20, 2015  (AU) ................................ 2015900587

(51) Int. Cl.
*A62C 99/00*       (2010.01)
*G09B 19/00*       (2006.01)
(Continued)

(52) U.S. Cl.
CPC ........ *A62C 99/0081* (2013.01); *A62C 31/005* (2013.01); *A62C 33/02* (2013.01);
(Continued)

(58) Field of Classification Search
CPC ... A62C 99/0081; A62C 31/005; A62C 33/02;
A62C 33/00; B65H 75/28;
(Continued)

(56) References Cited

U.S. PATENT DOCUMENTS 6,077,081 A    6/2000  Dunn
7,416,412 B2*  8/2008  Segrest ................. G09B 19/00
                                                434/226
2006/0240392 A1* 10/2006  Clifton ............... A62C 99/0081
                                                434/226

OTHER PUBLICATIONS

International Search Report dated Apr. 4, 2016 related to PCT/AU2016/050115, 3 pages.

* cited by examiner

*Primary Examiner* — Robert P Bullington
(74) *Attorney, Agent, or Firm* — Hovey Williams LLP (57) ABSTRACT

A firefighter training unit for simulating use of a fire extinguishing system, the unit including: a reel; a user-manipulable nozzle; a hose having opposite ends attached respectively to the reel and the nozzle and being partially wound around the reel, wherein rotation of the reel in a first rotational direction allows the hose to be unwound from the reel; a motor configured to drive the reel in a second rotational direction which causes the hose to be wound onto the reel; one or more devices for providing one or more output signals corresponding to one or more simulated operating conditions of the fire extinguishing system; and a controller configured to drive the motor in response to the one or more output signals so as to apply torque to the reel in the second rotational direction to simulate forces applied to the hose during operation of the fire extinguishing system.

18 Claims, 5 Drawing Sheets

(51) Int. Cl.
  *A62C 31/00*  (2006.01)
  *A62C 33/02*  (2006.01)
  *B65H 75/28*  (2006.01)
  *B65H 75/44*  (2006.01)
  *G09B 9/00*  (2006.01)
  *G09B 19/24*  (2006.01)
  *A62C 33/00*  (2006.01)

(52) U.S. Cl.
  CPC ......... *B65H 75/28* (2013.01); *B65H 75/4484* (2013.01); *G09B 9/00* (2013.01); *G09B 19/00* (2013.01); *G09B 19/24* (2013.01); *A62C 33/00* (2013.01); *B65H 2701/33* (2013.01)

(58) Field of Classification Search
  CPC .. B65H 75/4484; B65H 2701/33; G09B 9/00; G09B 19/00; G09B 19/24; H05K 999/99
  USPC ......................................................... 434/226
  See application file for complete search history.

FIREFIGHTER TRAINING UNIT

CROSS-REFERENCE TO RELATED APPLICATIONS

This application is a national stage entry under 35 U.S.C. 371 of International Patent Application No. PCT/AU2016/050115, filed Feb. 19, 2016, which claims the priority of Australian Patent Application No. 2015900587, filed Feb. 20, 2015, both of which are incorporated by reference herein in their entireties.

TECHNICAL FIELD

The present invention relates generally to equipment for training fire fighters and more particularly to firefighter training equipment that simulates real world conditions experienced by fire fighters in hazardous environments.

BACKGROUND OF INVENTION

Firefighter training is typically an expensive and potentially dangerous task. Often the realism experienced in a training environment is significantly limited due to the inability of an instructor to recreate fire activity in a safe manner.

Expensive hot fire training props are often in high demand and are limited to recreating the one scenario that they were developed for. Firefighter training is therefore limited in the variety of different scenarios that can be presented to trainee firefighters so that the value of training can diminish as the trainee becomes accustomed to the scenario that has been created. Such props also require the use of training vehicles, known as 'pumpers', to supply water to the training area, so that overall, significant man power is required to provide training opportunities to the fire fighters who are at the front line nozzles of firefighting equipment.

The use of breathing apparatus for front line fire fighters in an internal, structural fire fight, combined with dragging a hose line, carrying break and entry gear and other firefighting tools is made significantly more complex by the addition of smoke, fire activity and potential full structural collapse. The physical exertion and exhaustion felt by the firefight after a period of activity cannot often be experienced in a training environment.

There currently exists a need to develop firefighter training equipment that is relatively low cost, easy to deploy and adaptable to a number of training environments which nevertheless provides a high degree of realism in order to optimise the simulation experience. It would also be desirable to provide training equipment that ameliorates or overcomes one or more disadvantages or inconveniences of known firefighter training equipment.

SUMMARY OF INVENTION

One aspect of the present invention provides a fire fighting training unit for simulating use of a fire extinguishing system that includes a hose and a liquid spray outlet connected to one end of the hose, for dispensing a fire extinguishing liquid, the firefighting training unit including
a reel;
a user-manipulable nozzle;
a flexible and elongate member having opposite ends attached respectively to the reel and the nozzle and being at least partially wound about the reel, wherein rotation of the reel in a first rotational direction allows the elongate member to be unwound from the reel;
a motor configured to drive the reel in a second rotational direction, opposite to the first rotational direction which causes the elongate member to be wound onto the reel;
one or more devices for providing one or more output signals corresponding to one or more simulated operating conditions of the fire extinguishing system; and
a controller configured to drive the motor in response to the one or more output signals so as to apply torque to the reel in the second rotational direction to simulate forces applied to the hose during operation of the fire extinguishing system.

In one or more embodiments, a first operating condition is liquid flow rate through the nozzle, and a first device is a flow rate selector for selecting the liquid flow rate.

In one or more embodiments, a second operating condition is liquid spray pattern, and a second device is a liquid spray pattern selector for selecting the liquid spray pattern.

In one or more embodiments, a third operating condition is nozzle actuation to dispense a fire extinguishing liquid, and a third device is a nozzle actuation detector.

Conveniently, any one or more of the above mentioned devices may be fitted to the user manipulable nozzle.

In one or more embodiments, a fourth operating condition is rotational unwinding of the reel, and a fourth device is a rotational speed detector for detecting the rotational unwinding speed of the reel. Conveniently, the detector may be an encoder coupled to the reel.

In one or more embodiments, the torque caused to be applied to the motor by the control is dependent on configuration data accessible by the controller. This configuration data may include any one or more of:
fluid pressure, elongate member construction, elongate member length, floor surface and maximum force.

In one or more embodiments, a fifth device is mounted to the nozzle for capturing image data during use of the firefighter training unit.

In one or more embodiments, the elongate member is a flexible hollow tube, and may be made from canvas, plastic, rubber or other material typically used in the construction of firefighting hoses.

In one or more embodiments, the firefighter training unit further includes electrical cabling extending within the tube between the one or more devices and the controller, for the purpose of transmitting data between the one or more devices and the controller.

In one or more embodiments, the fighting training unit may further include a fluid supply, and at least one inflation device coupled to the fluid supply for inflating at least a portion of the tube to simulate pressurization of the hose of the fire extinguishing system. Conveniently, the fluid supply may be a pressurised air container. In this case, the inflation device may be, for example, an air line extending within at least a portion of the tube.

In one or more embodiments, the firefighter training unit includes one or more clamps to clamp the unit to a support surface, such as a floor.

In one or more embodiments, the controller may include a processor and a non-transitory computer readable medium storing program instructions to cause the processor to compute to the torque to be applied to the motor and to apply that computed torque.

Another aspect of the invention provides a method of operating a firefighter training unit according to any one or more of the preceding claims, the method including the steps of:

receiving one or more output signals from the one or more devices, the output signals corresponding to one or more simulated operating conditions of the simulated fire extinguishing system; and driving the motor in response to the one or more output signals so as to apply torque to the reel in the second rotational direction to simulate forces applied to the hose during operation of the fire extinguishing system.

The fighting training unit can comprise a base station at which the reel, the motor and the controller are located and from which the elongate member and nozzle can be unwound from the reel. The base station can further include the fluid supply and the inflation device if provided.

The motor can be an electric motor, AC or DC, or it can be a petrol or diesel motor.

BRIEF DESCRIPTION OF DRAWINGS

Preferred embodiments of the present invention will now be described by way of non-limiting examples only with reference to the accompanying drawings in which.

DETAILED DESCRIPTION

Figure 1:
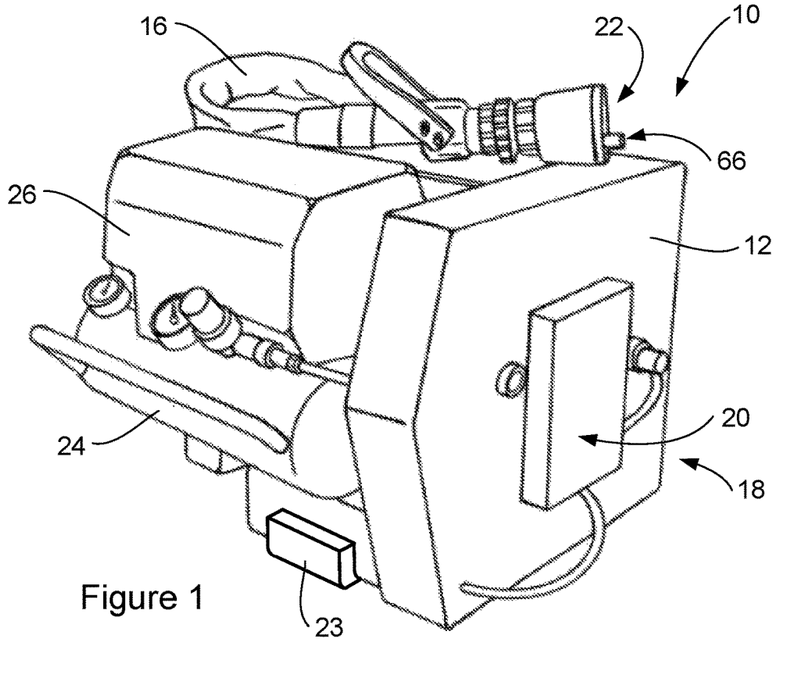
FIG. 1 is a perspective front view of a firefighter training unit according to one embodiment of the present invention.
Figure 2:
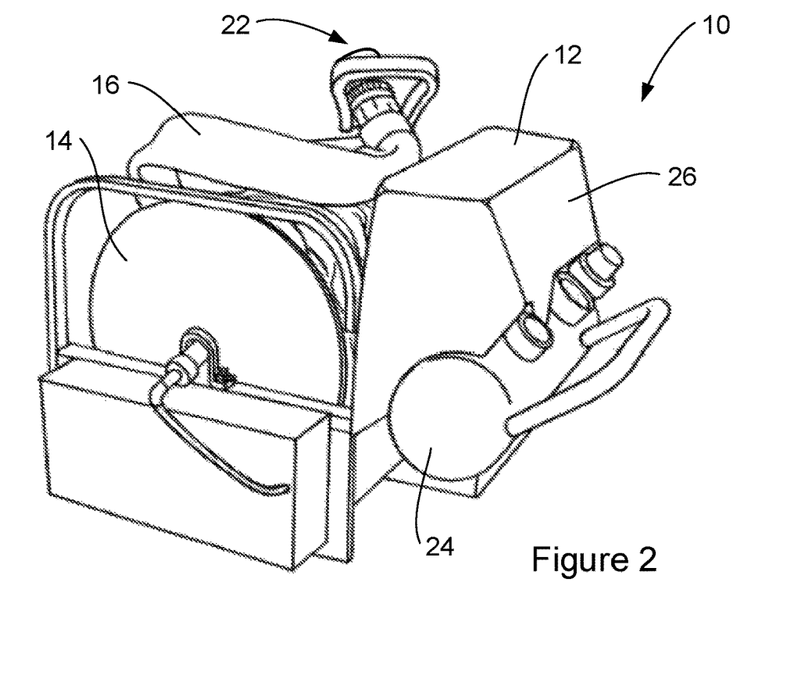
FIG. 2 is a perspective side view of the firefighter training unit of FIG. 1.

Referring now to FIGS. 1 and 2, there is shown a firefighter training unit 10 for use in training firefighters in simulated hazardous conditions. The firefighter training unit 10 includes a housing 12 in which is mounted a reel 14. A flexible hose 16, or other flexible hollow tube or other flexible elongate member is wound around the reel 14. In the embodiment depicted in FIGS. 1 and 2, the hose is made from material identical to hoses typically used by firefighters in extinguishing fires. However, in this embodiment water or other fire extinguishing fluid is not required to be pressurised within and expelled from the hose, and therefore in other embodiments of the invention different hollow or solid elongate members may be used.

The firefighter training unit 10 further includes a motor 18 configured to drive the reel 14 in one rotational direction as well as a servo control circuitry 20 configured to drive the motor 18. The firefighter training unit 10 also includes a user manipulable nozzle 22 attached or fixed to one end of the elongate member 16.

Depending on the environment in which it is used, it will be convenient to clamp the firefighter training unit 10 to the support surface upon which it rests by means of magnetic clamps 23 or like fixation devices in order to prevent lateral movement of the firefighter training unit 10 during simulation.

The firefighter training unit 10 also includes a container 24 of pressurised air as well as a compressor 26. As can be best seen in FIG. 3, in this exemplary embodiment an airline 28 extends within the hollow space inside the hose 16 between the nozzle 22 and reel 14. The pressured container 24 and compressor 26 act to supply pressurised air to the interior of the hose 16 to inflate the hose during firefighting simulations. In that regard, the airline 28 may include a series of apertures (not shown) running along its length in order to enable the pressurised air to be expelled from the airline to the interior of the hose 16.

The firefighting training unit 10 also includes one or more devices for providing one or more output signals corresponding to one or more simulated operating conditions of the simulated fire extinguishing system.

One or more of these devices may be user operable selectors for selecting the liquid flow rate, desired spray pattern of water or other fluid to be expelled from the simulated fire extinguishing system. In addition, one or more of the devices may detect another user action, for example, user actuation of a gate valve located on the nozzle 22 to expel liquid. In a real world fire extinguishing system, user actuated movement of a gate valve (see the gate valve 34 of FIG. 3) from a closed to an open position will cause water to be expelled from the hose of the fire extinguishing system.

Figure 3:
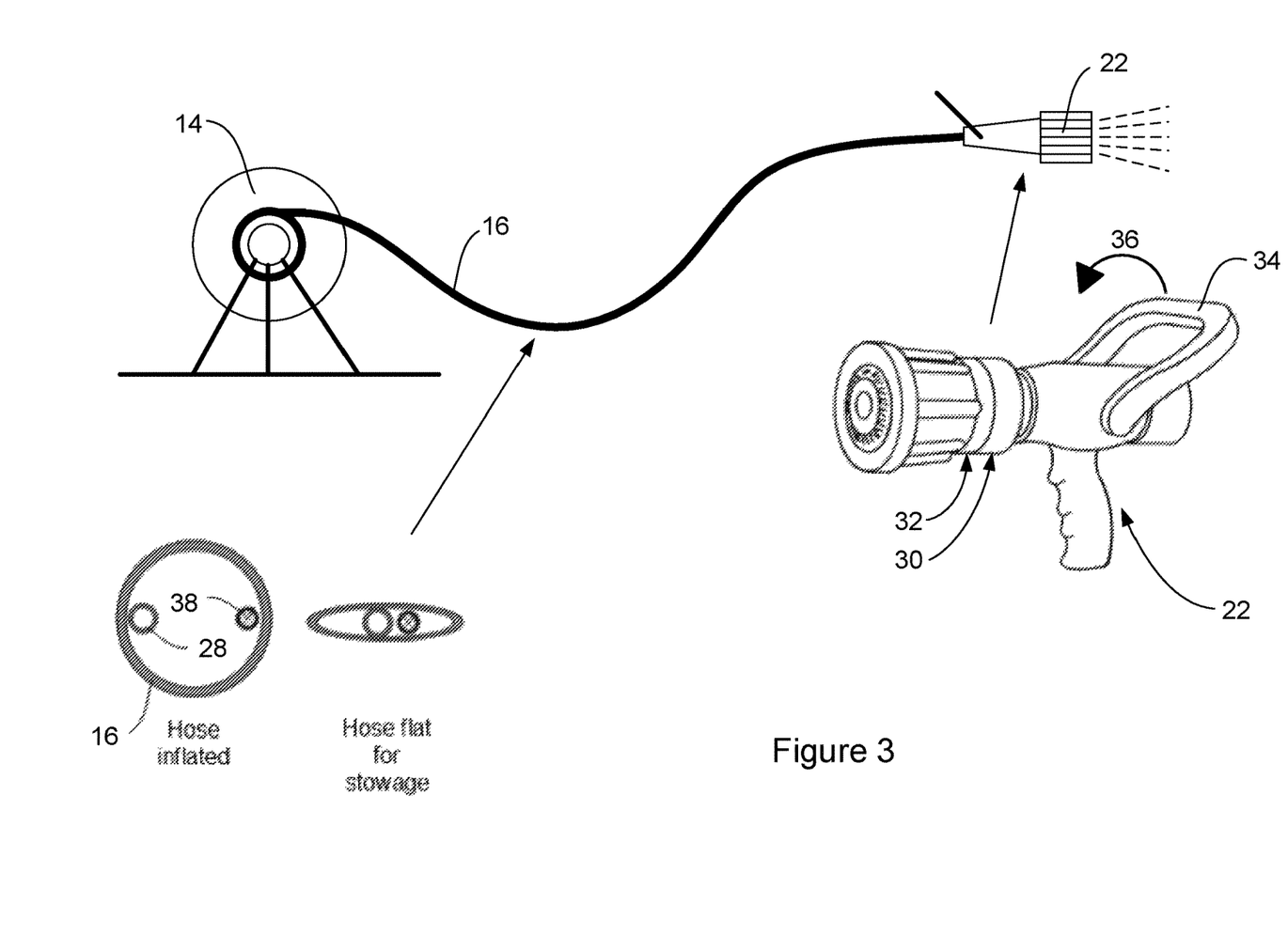
FIG. 3 is a schematic diagram of the firefighter training unit of FIGS. 1 and 2 and depicts further details of an elongate member and user-manipulable nozzle forming part of that firefighter training unit.

Conveniently, such devices are mounted in the exemplary embodiment shown in FIGS. 1 to 3 on the nozzle 22. Both the flow rate selector 30 and the spray pattern selector 32 can be formed from rings mounted around the barrel of the nozzle 22 with encoders or industrial analogue potentiometers attached to the rings so as to detect the angular position in which each ring is placed by an operator. The gate valve position detector 40 (see FIG. 4) can be a simple switch housed within the nozzle 22 and operable when the gate valve 34 or like mechanism is moved in the direction of the arrow 36 from an off to an on position. Electrical cabling 38 extends within the hose 16 between the spray pattern selector 32, flow rate selector 30 and gate valve position detector 40, and the controller 20 for data transmission.

Figure 4:
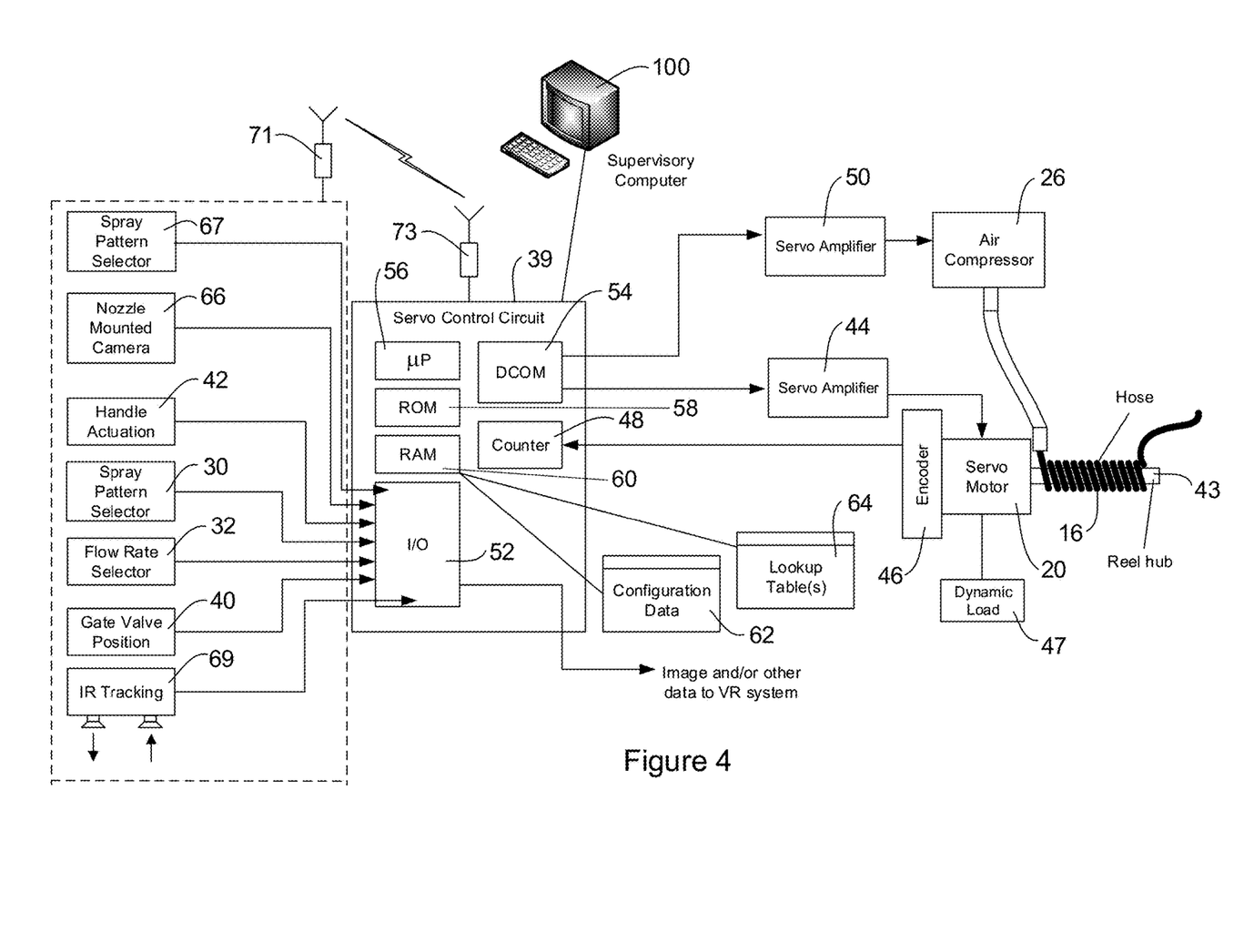
FIG. 4 is a schematic diagram sensors and servo control circuitry used to control operation of a servomotor connected to a hoses reel and air compressor forming part of the firefighter training unit shown in FIGS. 1 to 3.

As can be seen in FIG. 4, the spray pattern selector 30 and flow rate selector 32 provide output signals corresponding—respectively to the spray pattern selected by an operator and the flow rate selected by an operator—to a controller 39. The gate valve position detected by a gate valve position detector 40 is provided as another output signal to the controller 39. A dead man switch or other actuation detector 42 may also be included in the nozzle 22 to provide a further output signal to the controller 38, in this case being indicative of the grasping of the nozzle by a user.

As can be also seen in FIG. 4, the motor 20 is connected to a hub 43 of the reel 14, the hose 16 being wound around that hub 43. Operation of the motor 20 is controlled by current from a servo amplifier 44, which is in turn controlled by the controller 39. An encoder 46 is coupled to the motor 20 to provide a position feedback signal to the controller indicative of the rotational speed of the reel, to the controller 39. In that regard, a counter 48 is provided as part of the controller 39, the frequency with which pulses are received from the encoder 46 being indicative of the rotational speed of the reel 14.

In one or more embodiments, a dynamic load 47 may be coupled to the motor 20 to restrict advancement of the elongate member 16 out of the reel 14. The dynamic load 47 assists in the delivery of step up or advancement forces at the hardware level and reduces the likelihood of damage to the electronics if a user pulls too fast on the elongate member 16, which would otherwise create a generator-like effect that could introduce damaging voltages into the system. The dynamic load 47 may include a resistance connected in shunt across the motor 20.

Similarly, the air compressor 26 is coupled to one end of the hose 16 in order to pressurize air within the airline 28 and thereby inflate the hose 16. The air compressor 26 is controlled by current from a servo amplifier 50, which is in turn controlled by the controlled by the controller 39.

Input/output circuitry 52 is provided as part of the controller 39 in order to receive the output signals from the gate valve position detector 40, flow rate selector 32, spray pattern selector 30 and handle actuation detector 42. In addition, a digital communication link 54 is provided as part of the controller 39 in order to send control signals to the servo amplifiers 44 and 50.

The controller 39 includes a processor 56, read only memory or other non-transitory computer readable medium 58 storing program instructions to cause the processor to perform various computations described herein and to generate control signals to be transmitted to the servo amplifiers 44 and 50 from the digital communication link 54. In performing its various operations, the processor 56 uses data stored in a volatile memory 60, including configuration data 62 and one or more look up tables 64.

It will be appreciated that the gate valve position detector 40, flow rate selector 32, spray pattern selector 30, handle actuation detector 42 and encoder 46 and merely examples of devices that may form part of the firefighter training unit 10 to provide one or more output signals corresponding to one or more simulated operating conditions of a real world fire extinguishing system.

Figure 6:
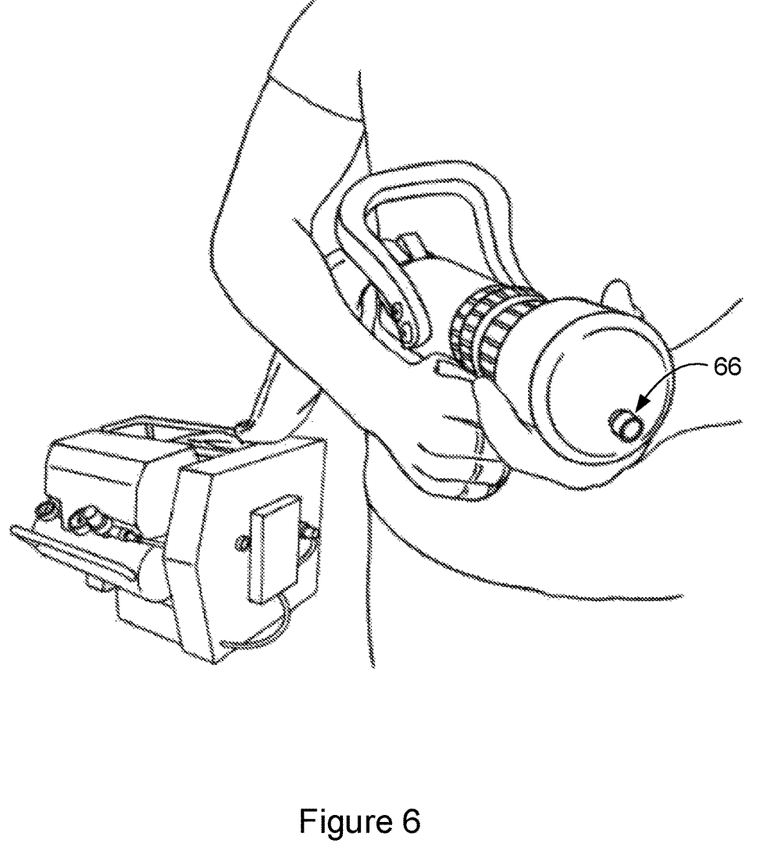
FIG. 6 is a perspective view of firefighter training unit shown in FIGS. 1 and 2 when in use during firefighting simulation activities by a user.

Another exemplary such device is a camera 66 (best seen in FIG. 6), that may be conveniently mounted to the nozzle 22, which provides an output signal to the controller 39 corresponding to images captured from the environment surrounding the firefighting training unit. This captured image data together with other data from the various devices forming part of the firefighter training unit 10 (such as the selected spray pattern) may be provided to a virtual reality system for incorporation into a display presented to a firefighter undergoing training in order to provide a more immersive training experience. As is the case with the detectors 32, 30, 40 and 42, a connection between the nozzle mounted camera 66 and the controller 39 may be provided by means of the electrical cable 38 extending between the nozzle 22 and the controller 38 inside the hose 16.

Other exemplary devices include an inertial measurement unit 67 and infra-red tracking unit 69. The inertial measurement unit 67 includes using a combination of accelerometers and gyroscopes, and possibly magnetometers, to track the pose and orientation of the user manipulable nozzle 22 during simulation so that an accurate representation of a jet of water coming from the user manipulable nozzle 22 can be generated by a virtual reality system.

The infra-red tracking unit 69 includes a head with infra-red reception and transmission capacities. Such a unit enables a trainer to use simple active markers on walls or other surfaces in a training environment, for example, to differentiate different types of fires.

In some embodiments, rather than relying upon the electrical cable 38, wireless transmission/reception devices 71 and 73 may be provided to enable communication between the controller 39 and the various nozzle-mounted devices.

In use, when a user grasps the nozzle 22 and moves away from the firefighter training unit 10, the force applied by the hose 16 to the reel 14 causes rotation of the reel 14 in one rotational direction so as to unwind the hose from the reel.

The controller acts to drive the servo motor 20 in response to the various output signals received at the controller 39, taking into account configuration data (defining operational parameters of a fire extinguishing system to be simulated and various other parameters that may be required) to apply to torque to the reel 14 in the opposite rotational direction thereby to simulate the sum of one or more forces applied to the hose 16 during operation of the real world fire extinguishing system.

Figure 5:
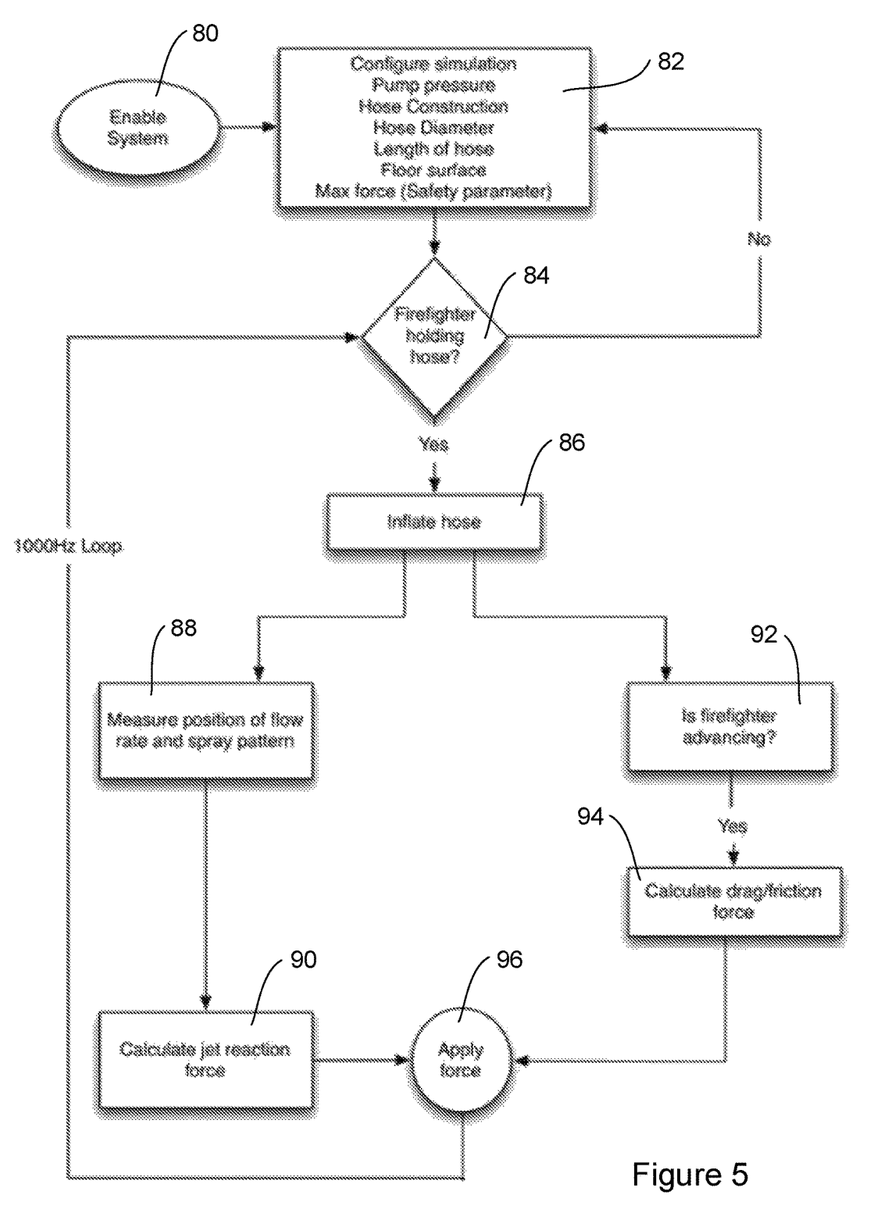
FIG. 5 is a flow chart depicting various data processing steps performed by a controller forming part of the servo control circuit depicted in FIG. 4.

FIG. 5 depicts a flow chart showing various steps performed by the controller 39 in the computation and application of a suitable torque to the reel 14 in order to simulate the sum of those various forces applied to the hose of the real world fire extinguishing system. After the firefighter training unit 10 and controller 38 are enabled at step 80, the controller 39 initially accesses configuration data 62, at step 82. The configuration data 62 may include any one or more of fluid pressure, hose construction, hose diameter, hose length, floor surface properties (in order to determine a frictional force that may be experienced by a firefighter) and a maximum force/torque that may be generated by the servo motor 20 as a safety parameter.

This configuration data 62 can be set up via an operator control panel (not shown). All selections can be made from one or more different groups of configuration data in order to simulate different types of fire extinguishing systems.

At step 84, the controller 39 interprets the presence of a firefighter by detecting handle actuation from an output signal provided by the dead man's switch 42. When handle actuation is detected the controller 39 acts at step 86 to cause the air compressor 36 to inflate the hose 16 by means of the airline 28.

Before determining the value of the torque to be applied to the reel 14, the controller 39 firstly detects the position of the encoder or industrial analogue potentiometer forming part of the spray pattern selector 30 fitted about the nozzle 22, as well as the position of the encoder or analogue potentiometer of the flow rate selector 32 which is also fitted about the nozzle 22 (step 88). Once these two selections have been made at step 88, the controller 39 accesses information stored in the look up table 64 and, at step 90, computes a jet reaction force (also called nozzle reaction force) that would be applied to the nozzle of a real fire extinguishing system.

In addition, at step 92, the controller 39 determines whether the firefighter holding the nozzle 22 is moving away from the reel 14. If this is the case, the controller 38 access the look up table 64 to determine the dragging (set up) force that would be required to drag a full hose over a floor surface of the type identified by the configuration data at step 94. Once the jet reaction force 90 and the drag/friction force 94 have been computed, these two forces are summed by the controller 39, and signals sent to the servo amplifier 44 in order to cause the servo motor 20 to apply a torque to the reel 14 in the opposite rotational direction to that caused by the firefighter moving away from the reel 14, at step 96.

When the firefighter stops, and the controller 39 detects from the pulses provided by the encoder 46 that the reel rotational velocity has reduced to zero, the controller 38 will remove the drag/friction force computed at step 94 from the force applied by the motor 20.

It will be appreciated that the flow rate and spray pattern selected will have an effect on the jet reaction force calculated. In simple terms, a directional jet of fluid will generate more jet reaction force than will a fog or more dispersed spray pattern, whilst a higher flow rate will provide more jet reaction flow rate than a lower flow rate. A higher pump pressure (part of the configuration data) will also affect the jet reaction force, a higher pressure generating more force. A larger hose diameter will also allow for higher flow rates which will also affect the calculation of the jet reaction force.

In various embodiments, a supervisory computer 100 may be connected by USB, Ethernet, wireless or other suitable connection means to the controller 20 to enable a trainer to control the real-time experience of a user of the firefighter training unit 10.

Finally it is to be understood that various modifications and/or additions may be made the above described embodiments without departing from the spirit or ambit of the invention as defined in the claims appended hereto.

The invention claimed is:

1. A firefighter training unit for simulating use of a fire extinguishing system including a hose and liquid spray outlet for expelling a fire extinguishing liquid, the firefighter training unit including:
    a reel;
    a user-manipulable nozzle;
    a flexible and elongate member having opposite ends attached respectively to the reel and the user-manipulable nozzle and being partially wound around the reel, wherein rotation of the reel in a first rotational direction allows the flexible and elongate member to be unwound from the reel;
    a motor configured to drive the reel in a second rotational direction opposite to the first rotational direction which causes the flexible and elongate member to be wound onto the reel;
    one or more devices for providing one or more output signals corresponding to one or more simulated operating conditions of the fire extinguishing system; and
    a controller configured to drive the motor in response to the one or more output signals so as to apply torque to the reel in the second rotational direction to simulate forces applied to the hose during operation of the fire extinguishing system.

2. The firefighter training unit according to claim 1, wherein
    one of the one or more simulated operating conditions is a liquid flow rate through the user-manipulable nozzle, and one of the one or more devices is a flow rate selector for selecting the liquid flow rate.

3. The firefighter training unit according to claim 1, wherein
    one of the one or more simulated operating conditions is a liquid spray pattern, and one of the one or more devices is a liquid spray pattern selector for selecting the liquid spray pattern.

4. The firefighter training unit according to claim 1, wherein
    one of the one or more simulated operating conditions is a nozzle actuation to dispense the fire extinguishing liquid, and one of the one or more devices is a nozzle actuation detector.

5. The firefighter training unit according to claim 1, wherein
    any of the one or more devices are fitted to the user-manipulable nozzle.

6. The firefighter training unit according to claim 1, wherein
    one of the one or more simulated operating conditions is a rotational unwinding speed of the reel, and one of the one or more devices is a rotational speed detector for detecting the rotational unwinding speed of the reel.

7. The firefighter training unit according to claim 6, wherein the rotational speed detector is an encoder coupled to the reel.

8. The firefighter training unit according to claim 1, wherein the torque applied by the motor is dependent on configuration data accessible by the controller.

9. The firefighter training unit according to claim 8, wherein the configuration data includes any one or more of:
    fluid pressure, elongate member construction, elongate member diameter, elongate member length, floor surface and maximum force.

10. The firefighter training unit according to claim 1, wherein
    one of the one or more devices is mounted to the user-manipulable nozzle for capturing image data during use of the firefighter training unit.

11. The firefighter training unit according to claim 1, wherein the flexible and elongate member is a flexible hollow tube.

12. The firefighter training unit according to claim 11, and further including
    electrical cabling extending within the flexible hollow tube between the one or more devices to the controller for the purpose of transmitting data between the one or more devices and the controller.

13. The firefighter training unit according to claim 11, and further including a fluid supply; and at least one inflation device coupled to the fluid supply for inflating at least a portion of the flexible hollow tube to simulate pressurization of the hose of the fire extinguishing system.

14. The firefighter training unit according to claim 13, wherein the fluid supply is a pressurized air container.

15. The firefighter training unit according to claim 14, wherein the inflation device is an air line extending within at least a portion of the flexible hollow tube.

16. The firefighter training unit according to claim 1, and further including
    one or more clamps to clamp the firefighter training unit to a support surface.

17. The firefighter training unit according to claim 1, wherein the controller includes:
    a processor; and
    a non-transitory computer readable medium storing program instructions which cause the controller to compute the torque to be applied by the motor and to apply the torque.

18. A method of operating the firefighter training unit according to claim 1, the method including the steps of:
    receiving one or more output signals from the one or more devices, the one or more output signals corresponding to the one or more simulated operating conditions of the simulated fire extinguishing system; and
    driving the motor in response to the one or more output signals so as to apply the torque to the reel in the second rotational direction to simulate the forces applied to the hose during the operation of the fire extinguishing system.

* * * * *